United States Patent Office 3,595,814
Patented July 27, 1971

3,595,814
URETHANES CONTAINING MONOCARBAMATE
CHAIN EXTENDERS
Rodney Frederick Lloyd and George Phillip Speranza, Austin, Tex., assignors to Jefferson Chemical Company, Inc., Houston, Tex.
No Drawing. Filed Nov. 14, 1968, Ser. No. 775,923
Int. Cl. C08g 22/16, 22/44
U.S. Cl. 260—2.5AM
10 Claims

ABSTRACT OF THE DISCLOSURE

The use of monocarbamates as chain extenders in polyurethane compositions provides for the production of polyurethane elastomers having improved tensile strength, tear strength and elongation properties. The use of this class of chain extenders also provides for the production of a foamed polyurethane elastomer having a strong, scuff-resistant integral skin.

The noncellular elastomers are useful as sealants, gaskets, floor coverings and flexible molds used in the production of molded plastics. The self-skinning cellular foam is useful as crash pads and the like without the necessity of having a strengthening and decorative coating attached thereto.

BACKGROUND OF THE INVENTION

When an organic polyisocyanate is reacted with a polyether polyol to produce a polyurethane composition, various components are introduced into the system in order to adjust the physical properties of the resulting polyurethane composition. For example, if a cellular product is desired, water or an appropriate blowing agent is added to the polyurethane reaction mixture. In order to adjust properties of various polyurethane compositions such as the tensile strength elongation, tear strength, flexibility, the softness or hadness of the resulting composition, or the color, various other additives are used. Often the addition of an additive to improve one particular property results in the degradation of other properties of the polyurethane composition. For instance, an additive which increases the tensile strength of a solid polyurethane composition such as various fillers may result in a decrease in the elongation of the resulting polyurethane composition. Therefore, it is necessary to achieve a balance of properties for a given use.

Solid polyurethane compositions have found usefulness in gaskets, sealants, floor coverings, and the like. More recently, with the advent of molded, rigid plastics, it has become desirable to provide a flexible polyurethane mold for use in the place of the more expensive silicone-type molds currently being used. In order for a polyurethane composition to be acceptable for this use, it must be soft and flexible, yet have good tensile and tear strength so that the mold does not become unusable after a short period of time due to tears or splits in the mold material. Heretofore, polyurethane compositions have not been acceptable for this purpose.

Polyurethane compositions generally in use as floor coverings are systems dissolved in a solvent which are moisture-cured by the atmosphere after application on the floor. These floor coatings have been found to suffer considerably from "bleed through," especially when placed on a substrate which had previously been covered with some other type of floor covering. While there are some single component floor coatings (i.e., no solvent), these have been found to be lacking in one or more of the desired properties for an acceptable floor coating. To be an acceptable floor covering composition, it is desirable that the elastomer be strong, scuff-resistant and yet flexible enough to conform to shifts in the floor.

With the widespread use of foam crash pads in automobiles and the like, it has become desirable to develop a crash pad with a tough scuff-resistant skin which is integral to the foam of the crash pad itself. Previously, it was necessary to line the mold in which the crash pad was to be cast with a decorative coating such as vinyl and the like in order to achieve the strength and scuff-resistance necessary for the pad, and yet maintain an attractive appearance of the crash pad itself. Previous attempts at producing a polyurethane foam crash pad having an integral skin which would meet these qualifications have met with considerable difficulty and disappointing results.

The advantages and objects of our invention will be apparent to those skilled in the art, in view of the aforementioned background, the following discussion and accompanying examples.

SUMMARY OF THE INVENTION

Our invention relates to the production of polyurethane compositions having improved physical properties due to the presence of the chain extender of our invention. The chain extender of our invention is a monocarbamate of the formula:

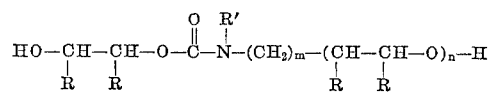

where R, taken individually, is hydrogen or an organic radical unreactive with hydroxyl, isocyanato, or —NH— groups, R' is hydrogen, lower alkyl or aryl, $m$ is 0 to 2 and $n$ is 1 or 2.

Our invention is more particularly directed to an improved solid polyurethane composition useful as sealants, floor coatings and molds. Our invention is also particularly directed to the provision of an integral skin on a foamed cellular polyurethane composition containing the chain extender of our invention. This integral skinned cellular polyurethane composition produces a product having the desired properties of a foam crash pad in addition to having a tough, scuff-resistant integral skin, thus obviating the necessity of lining the mold with a separate skinning material.

The chain extender of our invention is incorporated into the reaction mixture of an organic isocyanate and an organic polymeric polyhydroxy compound such as polyester or polyether polyols used for the production of polyurethane compositions, along with a urethane catalyst and various additives frequently used in the polyurethane art.

DESCRIPTION OF THE INVENTION

To improve the properties of polyurethane compositions prepared by catalytically or noncatalytically reacting an organic polyisocyanate with organic polymeric polyhydroxy compounds such as polyester or polyether polyols, a monocarbamate chain extender of the following formula is incorporated therein:

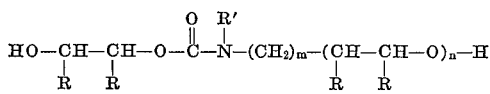

where R, taken individually, is hydrogen or an organic radical unreactive with hydroxyl, isocyanato or —NH— groups, R' is hydrogen, lower alkyl or aryl $m$ is 0 to 2 and $n$ is 1 or 2.

The monocarbamate useful in the practice of my invention may be produced by reacting an organic carbonate described by the formula

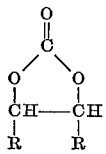

with an amine described by the formula

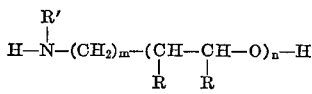

where R, R', $m$ and $n$ are as described above. The reaction generally proceeds as follows:

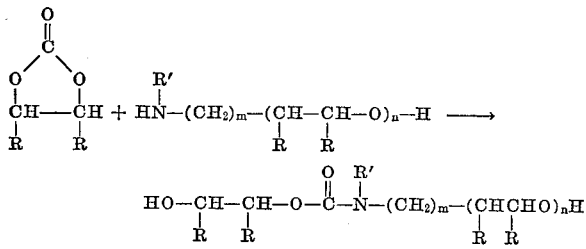

Some especially preferred carbamates are 2-hydroxyethyl 2-hydroxyethylcarbamate, 2-hydroxyethyl 2-hydroxypropylcarbamate, 2-hydroxypropyl 2-hydroxyethylcarbamate, 2-hydroxypropyl 2-hydroxypropylcarbamate, 2-hydroxyethyl 3-hydroxypropylcarbamate, 2-hydroxyethyl 2-hydroxy-2-phenylethylcarbamate, and the like.

The reaction between an amine and a carbonate is a generally well-known chemical reaction. The organic carbonates used in the reaction to produce the monocarbamate useful in the practice of our invention are generally derived from olefinic hydrocarbons from which the epoxide has been formed and further reacted with carbon dioxide to produce the organic carbonate. One representative process for the production of organic carbonates from an epoxide is described in U.S. Pat. No. 2,773,070. Therefore, R may be either hydrogen or an organic radical which is unreactive with isocyanato or hydroxyl groups so as not to interfere with the production of the polyurethane composition. Preferably R would be hydrogen, $C_1$ to $C_{18}$ alkyl, or aryl group. Especially preferred are hydrogen, $C_1$ to $C_4$ alkyl (lower alkyl), phenyl, benzyl or tolyl. Most preferably the carbonates used would be ethylene carbonate, propylene carbonate, butylene carbonate, amylene carbonate, heptene carbonate, octene carbonate, styrene carbonate, and the like.

Where R is other than hydrogen, the resulting monocarbamate used in the practice of our invention is generally more compatible with the higher molecular weight polymeric polyhydroxy compounds used in the reaction with an organic isocyanate to produce the polyurethane composition. Where R is hydrogen or a lower alkyl group (i.e., from $C_1$ to $C_4$ alkyl), stirring is necessary to insure that the monocarbamate chain extender is completely and uniformly dispersed through the polymeric polyhydroxy component when the reaction with the organic isocyanate occurs. We have found that carbamates based on propylene carbonate are more compatible than those based on ethylene carbonate, even though the difference in one R group is only a single carbon atom.

The amine used as described by the above formula in the reaction are those primary or secondary amines which will open the carbonate ring at the carbonyl group to form the carbamate. Attached to the nitrogen atom of the amine is a hydroxy alkyl or hydroxyalkoxy group in order that there be a terminal hydroxyl group which can be reacted with the isocyanate in the urethane forming reaction. The R groups resulting from the amine used to form the carbamate also may be hydrogen or an organic radical which is not reactive with isocyanate or hydroxyl groups; and, as above, is preferably hydrogen, $C_1$ to $C_{18}$ alkyl, or aryl group. It is especially preferred that these R groups be hydrogen, lower alkyl, phenyl, benzyl or tolyl groups. The other bond on the nitrogen atom, R', may be taken up with hydrogen, aryl or a lower alkyl group such as methyl, ethyl, propyl, butyl, amyl, hexyl, their isomers, or phenyl. Representative amines are monoethanolamine, monoisopropanolamine, monobutanolamine, 2-hydroxy-2-phenethylamine, N-methyl-2-hydroxyethylamine, N-propyl-2-hydroxyethylamine, 2-hydroxyethoxyethylamine, N-phenyl-2-hydroxyhexylamine, 3-hydroxypropylamine, and the like.

In the production of polyurethane compositions, polymeric polyhydroxy compounds such as polyester or polyether polyols are reacted with organic polyisocyanates to produce a polyurethane composition. Polyether polyols are described herein, and polyester polyols are described in U.S. Patent 3,391,093, for example. This reaction usually occurs in the presence of a catalyst but may occur noncatalytically when a polyol containing tertiary nitrogen atom is used. In the practice of my invention, the above-described monocarbamates are included in this reaction mixture to produce improved polyurethane compositions. When a solid polyurethane composition is produced using the monocarbamate chain extender of our invention, we have discovered that improved tensile strength tear strength and elongation results. With the monocarbamate chain extender of our invention, strong yet flexible floor coverings and sealants are possible. In addition, soft, flexible molds can be produced which have improved tear strength but yet have sufficient compression strength to withstand pressures produced when the mold made from our polyurethane composition must contain an expanding cellular plastic.

We have also achieved foamed cellular polyurethane composition which has a tough integral skin which is useful for the production of molded crash pads and the like. These cellular polyurethane compositions are known to those in the art as "self-skinning foams" and require no additional skin material to impart strength, durability and attractiveness to the cellular polyurethane material. Using the polyurethane composition, including the carbamate chain extender of our invention, self-skinning foams with decorative finishes can be produced by merely etching or otherwise treating the mold to produce a skin which simulates the finish of a natural product such as wood or leather.

Suitable organic polyisocyanates useful in the practice of our invention are those organic diisocyanates, triisocyanates and polyisocyanates well-known in the polyurethane art. Mixed isomers of toluene diisocyanate which are readily available commercially such as those described in U.S. Pat. No. 3,298,976 and the like may be used. Especially preferred are diisocyanates and polyisocyanates prepared by the phosgenation of the reaction product between aniline and formaldehyde such as 4,4'-diphenylmethane diisocyanate, 2,4'-diphenylmethane diisocyanate and higher functionality polyphenylmethylene polyisocyanates, hereinafter called polyarylpolyisocyanates. Especially preferred organic polyisocyanates for forming solid polyurethane compositions are diphenylmethane diisocyanate and modified diphenylmethane diisocyanates sold under the trademark of Isonate® 143L. Polyarylpolyisocyanates which are used in the practice of our invention, particularly to produce cellular polyurethanes, have a functionality of from above 2.0 to about 3.3. An especially preferred functionality range is from about 2.2 to about 2.9.

Polyether polyols useful in the practice of our invention are those diols triols, tetrols and mixtures thereof having a molecular weight of from about 500 to about 10,000. The diols are generally polyalkylene ether glycols such as polypropylene ether glycol, polybutylene ether gycol, and the like, and mixtures thereof. Mixed polyether polyols can also be used such as the condensation products of an alkylene oxide with a polyhydric alcohol having three or four primary hydroxyl groups such as glycerol, trimethylolpropane, 1,2,6-hexanetriol, pentaerythritol, and the like. These polyether polyols are well-known and may be prepared by any known process such as, for example, the processes discussed in Encyclopedia of Chemical Technology, volume 7, pages 257–262, published by Interscience Publishers Inc. in 1951.

As mentioned above, any suitable polyhydric polyalkylene ether may be used, such as, for example, the condensation product of an alkylene oxide with a polyhydric alcohol. Any suitable polyhydric alcohol may be used such as, for example, ethylene glycol, 1,2-propylene glycol, 1,3-propyene glycol, 1,4-butylene glycol, 1,3-butylene glycol, glycerine, trimethylolpropane, 1,2,6-hexanetriol, pentaerythritol, and the like. Any suitable alkylene oxide may be used such as, for example, ethylene oxide, propylene oxide, butylene oxide, amylene oxide, their various isomers, and the like. Of course the polyhydric polyalkylene ether polyols can be prepared from other starting materials such as, for example, tetrahydrofuran, epihalohydrin, aralkylene oxides such as, for example, styrene oxide, and the like. Polyhydric polyether polyols having three or four hydroxyl groups per molecule and a molecular weight of from about 2,000 to about 10,000 can be used. The polyol used can be a blend of diols with triols or tetrols to produce a polyol blend having an average molecular weight of from about 500 to about 10,000. Blended diols and triols for use in solid polyurethane elastomers is generally discussed in U.S. Pat. No. 3,391,101. Most preferred for use either alone or blended with a diol are the polyoxyalkylene triols and tetrols having a molecular weight of from about 2,000 to about 7,000.

The polyether polyols may have primary or secondary hydroxyl group termination. When the polyhydric alcohol is reacted with an alkylene oxide such as propylene oxide butylene oxide, and the like, the terminal groups are predominately secondary hydroxyl groups. However, it is within the scope of our invention to use polyether triols polyether tetrols which have from about 5 to about 15 wt. percent ethylene oxide added thereto in a final alkoxylation step by the known alkylation processes in order to increase the terminal primary hydroxyl content of the said polyether polyol. The manufacture of ethylene oxide "tipped" polyether polyols is generally discussed in U.S. Pat. No. 3,336,242.

As hereinbefore mentioned, the polyether polyol and the organic polyisocyanate are reacted to form the polyurethane composition. This reaction may occur noncatalytically when a polyol is used which contains tertiary nitrogen compounds or may be carried out in the presence of known polyurethane catalysts. The use of a separate catalyst is preferred. The catalyst employed may be any of the catalysts known to be useful for this purpose, including tertiary amines and metallic salts. Suitable tertiary amines include N-methylmorpholine, N-ethylmorpholine, triethylenediamine, triethylamine, trimethylamine and N-dimethylethanolamine. Typical metallic salts include, for example, the salts of antimony tin, mercury and iron; for example, dibutyltin dilaurate phenylmercuric acetate and stannous octoate. The catalyst is usually employed in a proportion of from about 0.01% to 2% by weight based on the weight of the overall composition.

Various additives can be employed to provide different properties, e.g., fillers such as clay, calcium carbonate, talc, or titanium dioxide. Dyes and pigments may be added for color and anti-oxidants also may be used.

When the embodiment of our invention is practiced which involves the production of the self-skinning cellular polyurethane product, a foaming agent is employed which may be any of those known to be useful for this purpose such as water, the halogenated hydrocarbons, and mixtures thereof. Typical halogenated hydrocarbons include but are not limited to monofluorotrichloromethane, difluorodichloromethane, 1,1,2-trichloro-1, 1,2-fluoroethane-methylene chloride, and the like. The amount of foaming agent employed may be varied within a wide range. Generally, however, the halogenated hydrocarbons are employed in an amount from 1 to 50 parts by weight per 100 parts by weight of the polyol used in the production of the polyurethane composition. When water is employed as the blowing agent, it is present in the amount of from 0.1 to 10 parts by weight per 100 parts by weight of the polyether polyol. Halogenated hydrocarbon blowing agents for use in the production of a foamed polyurethane composition are discussed in U.S. Pat. No. 3,072,582.

When it is desired to practice our invention in producing a floor coating or sealant, it is often desirable to include therein a polyhydric cross-linking agent. Such cross-linking agents include, but are not limited to, polyhydric alcohols such as glycerol, trimethylolpropane, 1,2,6-hexanetriol or pentaerythritol, or amines such as ethylenediamine, N,N,N',N'-tetrahydroxypropylethylenediamine, and the like. These are included in the polyurethane composition such that they make up from about 0.02 wt. percent to about 10 wt. percent based upon the entire polyurethane composition. The use of such cross-linking agents are well-known and those skilled in the art will be able to readily determine the amount and type of cross-linking to use in order to achieve desired physical properties.

The monocarbamate chain-extending agent of our invention as described above is used in both solid polyurethane compositions and the self-skinning flexible or semiflexible polyurethane foam composition. The amount of the monocarbamate extending agent may be as low as 0.1 weight percent based on the polyol component in a solid elastomer polyurethane composition to about 50 weight percent of the entire formulation when used in the self-skinning foam polyurethane composition. It may be used either alone as the chain-extending agent or in conjunction with known chain-extending agents such as 1,4-butanediol, diethylene glycol, 4,4'-methylene bis-(2-chloroaniline), and the like. However, we have discovered that whether used alone or in conjunction with known chain-extending agents, the monocarbamate of our invention improves the tensile strength of the resulting polyurethane composition without detriment to other desired physical properties. When used in solid polyurethane compositions, the amount of 0.1 weight percent to about 15 weight percent, based upon the weight of the polyether polyol, and more preferably from about 0.5 to about 7 weight percent is employed.

In the production of the cellular self-skinning polyurethane compositions, the monocarbamate chain-extending agent used in the practice of my invention would be present in the amounts of from 10 weight percent to about 50 weight percent of the polyurethane reaction mixture, with preferred amount being from about 15 weight percent to about 35 weight percent.

The carbamate chain extender may be incorporated in the polyurethane compositions of our invention which are produced by either "one-shot" or prepolymer methods. In the "one-shot" system all the reactants and additives are mixed and reacted simultaneously. In the prepolymer a portion of a polyhydroxy compound is reacted with the organic polyisocyanate to form a reaction product which has unreacted isocyanate groups. This reaction product is then mixed and reacted with the rest of the polymeric polyhydroxy compound to form the polyurethane composition.

In reacting the polymeric polyhydroxy compound with the organic polyisocyanate, a ratio of isocyanate groups to hydroxyl groups is between about 0.8 to about 1.5. This ratio, called the isocyanate index, is preferably between 0.9 and about 1.3 for the solid polyurethane composition and 0.8 to about 1.3 for the cellular self-skinning product. An especially preferred range for both polyurethane compositions is from about 0.95 to about 1.2. An isocyanate index of about 1.0 has been found to give very good products.

As hereinbefore mentioned, where R is hydrogen the monocarbamate used in the practice of our invention is relatively incompatible with the polyether polyol with which the chain extender is most often mixed in the polyurethane reaction. Therefore, when this particular carbamate is used, the polyether polyol containing the monocarbamate chain-extending agent should be thoroughly mixed prior to reacting with the organic isocyanate used to produce the polyurethane composition. However, as the R groups on the monocarbamate of our invention contain more carbon atoms, the monocarbamate becomes more compatible with the polyether polyol. We have found that when a filler is used in the polyurethane composition, the monocarbamate is more compatible with the polyether polyol, and stirring which is sufficient to maintain the filler in suspension with the polyether polyol is also sufficient to maintain the monocarbamate in admixture therewith.

The following examples will more particularly illustrate our invention and should be considered for purposes of illustration only and not limitation thereof.

EXAMPLE I (A) Preparation of 2-hydroxyethyl 2-hydroxyethylcarbamate from monoethanolamine and ethylene carbonate To a one-litter, three necked flask equipped with a stirred, thermometer and dropping funnel was added monoethanolamine (305 g.). Then the addition of ethylene carbonate (melted) was begun. The temperature rose immediately, and after about 20 ml. was added the reaction temperature was 50° C. The remainder of the ethylene carbonate (total 445 g.) was added while maintaining the reaction mixture at 35 to 40° C. by cooling with ice. The reaction mixture was allowed to stand overnight and then it was stiripped at about 40 mm. Hg and 100° C. for one hour. The low viscosity, pale yellow liquid product had a hydroxyl number of 750 mg. KOH/g. (theory 753) and an amine equivalent of 0.04 meq./g.

(B) Preparation of a solid polyurethane composition using 2-hydroxyethyl 2-hydroxyethylcarbamate as a chain extender An ethylene-oxide termined polyoxypropylene triol of 3,000 molecular weight (500 g., 0.50 eq.) and 2-hydroxyethyl 2-hydroxyethylcarbamate prepared above (112 g., 1.50 eq.) were evacuated at 120° C. for 20 minutes to remove any moisture. After cooling to 25° C., a 350 g. portion of this polyol blend was mixed with stannous octoate catalyst (0.15 g.) and 167 g. of a modified diphenylmethane diisocyanate having an equivalent weight of 143 (Isonate® 143L). The isocyanate index was 1.0. The reaction mixture gelled in about 60 seconds at room temperature. After five days at room temperature, the solid polyurethane composition was tested and compared with a polyurethane composition produced using the same reactants in the same proportions by equivalents except that 1,4-butanediol was used as the chain-extending agent. The properties of the two solid polyurethane compositions are compared in Table 1. The monocarbamate chain extender gave a composition having much higher tensile and tear strength in addition to greater elongation.

TABLE 1

| | Chain extender | |
|---|---|---|
| | 2-hydroxyethyl 2-hydroxyethyl-carbamate | 1,4-butanediol |
| Hardness, Shore A₂ | 83-87 | 80-81 |
| Hardness, Shore D₂ | 36 | |
| Tensile strength, p.s.i | 2,313 | 1,194 |
| 100% modulus, p.s.i | 935 | 685 |
| Elongation, percent | 262 | 188 |
| Tear strength, p.l.i | 216 | 119 |
| Compression strength at 10% deflection, p.s.i | 206 | 339 |
| Compression set, Method B, percent | 53 | 43 |

EXAMPLE II (A) Preparation of 2-hydroxyethyl 2-(hydroxyethoxy)-ethylcarbamate To a one-liter, three-necked flask equipped with a stirred, thermometer and dropping funnel was added 2-(2-amino-ethoxy)ethanol (420 g.). Then melted ethylene carbonate (352 g.) was added over a two-hour period at 40 to 45° C. The product was then heated to 60° C. and held at this temperature for 30 minutes under 1.5 mm. Hg pressure.

(B) Preparation of a urethane elastomer using 2-hydroxyethyl 2-hydroxyethoxy)ethylcarbamate as a chain extender An ethylene-oxide terminated polypropylene triol of 3,000 molecular weight (1,000 g., 1.0 eq.) and 2-hydroxyethyl 2-(hydroxyethoxy)ethylcarbamate (3.0 eq.) prepared above were stripped together under vacuum at 110° C. A 350 g. portion of this polyol blend was mixed with 156 g. of the polyisocyanate of Example I and 0.3 g. of a 50% solution of stannous octoate catalyst. The reaction mixture was allowed to cure at room temperature over a three-day period to produce an elastomer having a Shore A₂ hardness of 65-66, with 928 p.s.i. tensile strength and 262% elongation. Another polyurethane composition was prepared using the same reactants in the same proportions except that the same equivalents of diethylene glycol was used in place of the monocarbamate chain extender. Table 2 is a comparison of the physical properties of the two solid polyurethane elastomer compositions.

TABLE 2

| | Chain extender | |
|---|---|---|
| | 2-hydroxyethyl 2-(hydroxy-ethoxy) ethyl carbamate | Diethylene glycol |
| Hardness, Shore A₂ | 65-66 | 74-75 |
| Tensile strength, p.s.i | 928 | 859 |
| 100% modulus, p.s.i | 314 | 674 |
| Elongation, percent | 262 | 140 |
| Tear strength, p.l.i | 110 | 126 |
| Compression strength at 10% deflection, p.s.i | 119 | 239 |
| Compression set, Method B, percent | 41 | 42 |

This comparison shows the carbamate produces a softer, more flexible elastomer as evidenced by its higher elongation and lower hardness, modulus, and compression-deflection properties, with no loss of tensile strength, as compared to using diethylene glycol as the extender. The tensile strength, in fact, was increased.

EXAMPLE III

This example illustrates the improvement in tensile strength in solid urethane elastomers for sealant application made possible by using the 2-hydroxyethyl 2-hydroxyethylcarbamate prepared in Example I, Part A.

An ethylene oxide terminated polyoxypropylene triol of 6,500 molecular weight (888 g., 0.40 eq.) was blended with calcined clay (614 g.) and trimethylolpropane (8 g., 0.20 eq.). After stripping under vacuum to 130° C. to remove any moisture, the blend was cooled and phenylmercuric acetate catalyst (4.1 g.) and 2-hydroxyethyl 2-hydroxyethylcarbamate (15 g., 0.20 eq.) were added. A portion (620 g.) of this polyol-filler-catalyst mixture was mixed with a polyarylpolyisocyanate (functionality about 2.3) at room temperature (NCO/OH=1.1/1.0). The properties of the cured elastomer are given in Table 3 below, where a comparison is made to a similar elastomer using the same formulation except the carbamate extender has been omitted. A significant improvement in the tensile strength of the composition including the monocarbamate chain extender, results without reduction in tear strength and only a slight loss in elongation.

TABLE 3

| 2-hydroxyethyl 2-hydroxyethylcarbamate, p.p.h. | 0.93 | None |
|---|---|---|
| NCO/OH | 1.1/1.0 | 1.1/1.0 |
| Hardness, Shore $A_2$ | 66–67 | 69–70 |
| Tensile strength, p.s.i. | 957 | 625 |
| Elongation, percent | 125 | 130 |
| Tear strength, p.l.i. | 79 | 67 |
| Compression strength at 10% deflection, p.s.i. | 152 | 176 |
| Copression set, percent (Method B) | 4 | 0 |

EXAMPLE IV (A) Preparation of 2-hydroxyethyl 2-hydroxypropylcarbamate

To a one-liter, three-necked flask equipped with a stirrer, thermometer and dropping funnel was added propylene carbonate (521 g., 5.10 eq.). This material was heated to 40° C. and monoethanolamine (305 g., 5.00 eq.) was added at such a rate so that the temperature of the reaction mixture did not exceed 50° C. After the addition was complete, the mixture was digested at 50° C. for one hour, then stripped under vacuum at 100° C. for 30 minutes. The light-yellow product had a hydroxyl number of 674 and an amine content of 0.07 meq./g.

(B) Preparation of a urethane elastomer using 2-hydroxyethyl 2-hydroxypropylcarbamate as a chain extender Urethane eleastomeric sealant was prepared from a blend of 6,500 molecular weight ethylene oxide terminated polyoxypropylene triol (1.0 eq.), a 4,000 molecular weight polyoxypropylene glycol (2.0 eq.), fully calcined clay filler (37.3 wt. percent, basis overall formulation), phenylmercuric acetate catalyst (0.20 wt. percent, basis overall) and the 2-hydroxyethyl 2-hydroxypropylcarbamate (2.0 eq.) prepared in Part A of this example. A portion (660 g.) of this blend was mixed with the polyarylpolyisocyanate of Example I such that the isocyanate index was 1.06 (NCO/OH=1.06/1.00). Testing the resulting solid elastomer revealed a 42–43 Shore $A_2$ hardness, 467 p.s.i. tensile strength, 805% elongation and 128 p.l.i. tear strength. A specimen of this elastomer had a compression strength of 64 p.s.i. at 10% deflection.

EXAMPLE V

This example will illustrate the improvement which 2-hydroxyethyl 2-hydroxyethylcarbamate imparts to a urethane elastomer which is useful as seamless flooring underlayment.

A blend was made of an ethylene oxide terminated 2,000 molecular weight polyoxypropylene glycol (1,600 g.), an ethylene oxide terminated 3,000 molecular weight polyoxypropylene triol (160 g.) and calcined clay filler (1,280 g.). To a portion (600 g.) of this blend was added trimethylolpropane (2.0 g.), phenylmercuric acetate catalyst (0.85 g.) and a polyarylpolyisocyanate having a functionality of about 2.7 (60 g., NCO/OH=1.1/1.0). This mixture was stirred rapidly and cast to give an elastomer with the properties described in Table 4.

To another portion (597 g.) of a polyol-clay blend, as described above in this example, was added trimethylolpropane (2.0 g.) phenylmercuric acetate catalyst (1.33 g.) and 2-hydroxyethyl 2-hydroxyethylcarbamate (3.7 g.). After this mixture was well dispersed, the same polyarylpolyisocyanate used above (70 g., NCO/OH=1.1/1.0)

was added. After stirring rapidly and casting, the mixture cured to a tough elastomer, the properties of which are described in Table 4. As can be seen from a comparison of the two products, use of 2-hydroxyethyl 2-hydroxyethylcarbamate produced an elastomer having higher tensile strength and elongation than was obtained when the extender was omitted. This increases the toughness and ability to compensate for structural movement, both of which are advantageous in seamless flooring underlayment.

TABLE 4

| 2-hydroxyethyl 2-hydroxyethylcarbamate, p.p.h. | 0.55 | None |
|---|---|---|
| NCO/OH | 1.1/1.0 | 1.1/1.0 |
| Hardness, Shore $A_2$ | 73–74 | 74–75 |
| Tensile strength, p.s.i. | 889 | 761 |
| Elongation, percent | 108 | 77 |
| Tear strength, p.l.i. | 71 | 65 |
| Compression strength at 10% deflection, p.s.i. | 209 | 190 |
| Compression set, percent (Method B) | 9.9 | 7.9 |

EXAMPLE VI

This example will illustrate the improvements produced by incorporating 2-hydroxyethyl 2-hydroxyethylcarbamate in soft, flexible solid urethane elastomers useful in making flexible molds.

A solution of an ethylene oxide terminated 6,500 molecular weight polyoxypropylene triol (280 g.), an ethylene oxide terminated 4,000 molecular weight polyoxypropylene glycol (555 g.) and 4,4′-methylene bis(2-chloroaniline) (50 g.) was prepared by heating the mixture to 110° C. under vacuum. This solution was cooled and divided into two portions for use as described below.

To one portion of the above blend was added a catalyst mixture of 24% lead octoate and an organomercury catalyst solution (Curithane® 252, 11%, phenylmercuricoleate at concentrations of 0.065% and 0.31%, respectively, basis total formulation. Sufficient polyarylpolyisocyanate as used in Example 1 was added to the catalyzed solution to produce an isocyanate to hydroxyl plus amine ratio of 1.02/1.00. The properties of the resulting elastomer are detailed in Table 5 below.

To the other portion of the blend was added 2-hydroxyethyl 2-hydroxyethylcarbamate (prepared in Example I, Part A) to an overall level of 1.8%. The catalyst system of 24% lead octoate and the 11% phenylmercuric oleate solution was added so that the levels of each catalyst was 0.05% and 0.50%, respectively, basis total formulation. The polyarylisocyanate of Example I was added at an $NCO/(OH+NH_2)$ ratio of 1.02/1.00. The properties of this elastomer are outlined in Table 5. The elastomer containing 2-hydroxyethyl 2-hydroxyethylcarbamate has higher tensile and tear strength. It also has better load-bearing ability as evidenced by a comparison of the compression strengths. This latter property is especially important in these soft elastomers, since the flexible molds made therefrom must have sufficient compression strength to offer adequate resistance to the plastic foams expanded inside the molds.

TABLE 5

| 2-hydroxyethyl 2-hydroxyethylcarbamate, p.p.h. | 1.8 | None |
|---|---|---|
| $NCO/(OH+NH_2)$ | 1.02/1.00 | 1.02/1.00 |
| Hardness, Shore $A_2$ | 33–34 | 33–34 |
| Tensile strength, p.s.i. | 384 | 293 |
| Elongation, percent | 463 | 447 |
| Tear strength, p.s.i. | 80 | 66 |
| Compression strength at 10% deflection, p.s.i. | 44 | 28 |

EXAMPLE VII

This example will illustrate the use of 2-hydroxyethyl 2-hydroxyethylcarbamate in self-skinning semiflexible foams. These foams may be prepared by the one-shot technique from various polyols, the diisocyanate of Example I, fluorocarbon 11 blowing agent, and N-(2-hydroxyethyl) 2-hydroxyethylcarbamate. The following example uses a 3,000 molecular weight ethylene oxide teminated polyoxypropylene triol and a catalyst system of dibutyltin dilaurate and trimethylaminoethylpiperazine.

| | Parts |
|---|---|
| Triol | 82.0 |
| 2-hydroxyethyl 2-hydroxyethylcarbamate | 18.0 |
| Dibutyltin dilaurate | 0.08 |
| Trimethylaminoethylpiperazine | 0.6 |
| F–11B fluorocarbon | 10.0 |
| Diisocyanate of Example I | 48.7 |

The mixture was foamed in a closed aluminum mold to form an elastomeric foam (density 14.8 lbs./cu. ft.) having a tough, scuff-resistant integral elastomeric skin. Samples of the foam had 64.5 p.s.i. tensile strength and 120% elongation. The foam and skin were flexible at −20° F. A foam similar to that prepared above, except diethylene glycol, was used in place of the carbamate extender, had tear strength and scuff-resistance so poor that the measurement of its properties was not undertaken.

EXAMPLE VIII

This example illustrates the preparation of an excellent self-skinning urethane elastomeric foam with 2-hydroxyethyl 2-hydroxyethylcarbamate as one of its ingredients. The polyol used was an ethylene oxide terminated 6,500 molecular weight polyoxypropylene triol and a polyarylpolyisocyanate having a functionality of 2.3.

| | Parts |
|---|---|
| Triol | 85.0 |
| 2-hydroxyethyl 2-hydroxyethylcarbamate | 15.0 |
| Dibutyltin dilaurate | 0.08 |
| Trimethylaminoethylpiperazine | 0.30 |
| F–11B fluorocarbon | 15.0 |
| Polyarylpolyisocyanate | 32.7 |

The mixture was foamed in a closed aluminum mold to produce an elastomeric foam (density 12.2 lbs./cu. ft.) having a tough, scuff-resistant integral skin. The product had 24.7 p.s.i. tensile strength and 128% elongation, and was very flexible at −20° F.

What is claimed is:

1. A polyurethane composition prepared by reacting an organic polyisocyanate with a polymeric polyhydroxy compound and a monocarbamate chain-extending agent of the formula:

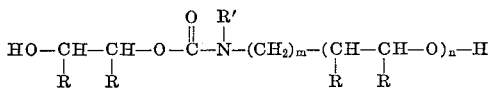

where R, taken individually, is hydrogen or an organic radical having 1 to 18 carbon atoms which is unreactive with hydroxyl, isocyanato, or —NH— groups, R' is hydrogen, m is 0 to 2 and n is 1 or 2.

2. The polyurethane composition of claim 1 wherein R is hydrogen, $C_1$ to $C_{18}$ alkyl or phenyl.

3. The polyurethane composition of claim 2 wherein m is 0 and n is 1.

4. The polyurethane composition of claim 1 wherein the monocarbamate is selected from 2-hydroxyethyl 2-hydroxyethylcarbamate, 2-hydroxyethyl 2-hydroxypropylcarbamate, 2-hydroxypropyl 2-hydroxylpropylcarbamate and 2-hydroxyethyl 2-hydroxyethoxyethylcarbamate.

5. A solid polyurethane elastomer prepared by catalytically reacting an organic polyisocyanate with a polyether polyol in the presence of at least 0.1 wt. percent of a monocarbamate of the formula:

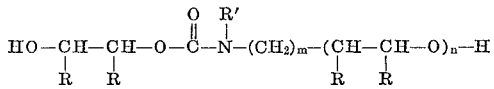

where R, taken individually, is hydrogen or an organic radical having 1 to 18 carbon atoms which is unreactive with hydroxyl, isocyanato, or —NH— groups, R' is hydrogen, m is 0 to 2 and n is 1 or 2.

6. The solid polyurethane elastomer of claim 5 wherein the polyether polyol is a mixture of a polyether triol and a polyether glycol having an average molecular weight from about 500 to about 10,000 and the isocyanate index is from about 0.9 to about 1.5.

7. The solid polyurethane elastomer of claim 6 wherein the organic polyisocyanate is a polyarylpolyisocyanate having an average functionality of from about 2.0 to about 3.3.

8. A cellular polyurethane composition prepared by catalytically reacting in the presence of a blowing agent an organic polyisocyanate with a polyether polyol and from 15 weight percent to about 50 weight percent based upon the weight of the overall formulation of a carbamate of the formula:

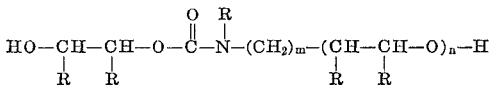

where R, taken individually, is hydrogen or an organic radical having 1 to 18 carbon atoms unreactive with hydroxyl, isocyanato, or —NH— groups, R' is hydrogen, m is 0 to 2 and n is 1 or 2.

9. The cellular polyurethane composition of claim 8 wherein the isocyanate index is from 0.8 to about 1.3 and the organic polyisocyanate is a polyarylpolyisocyanate having an average functionality of from 2.0 to about 3.3.

10. The polyurethane composition of claim 4 wherein the monocarbamate is 2-hydroxyethyl 2-hydroxyethyl carbamate.

References Cited

UNITED STATES PATENTS

| | | | |
|---|---|---|---|
| 2,627,524 | 2/1953 | Malkemus | 260—482 |
| 2,755,286 | 7/1956 | Bell et al. | 260—307 |
| 2,954,397 | 9/1960 | Martinek et al. | 260—482 |
| 3,248,373 | 4/1966 | Barringer | 260—77.5 |
| 3,294,751 | 12/1966 | Beitchman | 260—75 |
| 3,365,412 | 1/1968 | Thoma et al. | 260—32.6 |
| 3,368,985 | 2/1968 | Wismer et al. | 260—2.5 |
| 3,397,184 | 8/1968 | Heydkamp et al. | 260—77.5 |
| 3,415,768 | 12/1968 | Dieterich et al. | 260—29.2 |
| 3,459,789 | 8/1969 | Muller et al. | 260—482 |

FOREIGN PATENTS

| | | | |
|---|---|---|---|
| 39,781 | 6/1965 | Germany | 260—77.5 |
| 234,248 | 11/1963 | Austria | 260—77.5 |
| 1,045,806 | 10/1966 | Great Britain | 260—2.5 |

DONALD E. CZAJA, Primary Examiner

E. W. IVY, Assistant Examiner

U.S. Cl. X.R.

260—2.5AP, 2.5AQ, 2.5AZ, 77.5AM, 77.5AQ; 264—48

UNITED STATES PATENT OFFICE

CERTIFICATE OF CORRECTION

Patent No. 3,595,814                      Dated July 27, 1971

Rodney Frederick Lloyd and George Phillip Speranza
   Assignors to Jefferson Chemical Company, Inc.
   Houston, Texas, a corporation of Delaware It is certified that errors appear in the above-identified patent and that Letters Patent are hereby corrected as shown below:

In column 5, line 50, after "propylene oxide" should be inserted -- , --; in column 5, line 53, after "triols" should be inserted -- or --; in column 5, line 56, "alkylation" should read -- alkoxylation --; in column 5, line 74, after "antimony" should be inserted -- , --. In column 7, line 43, "stirred" should read -- stirrer --. In column 8, line 9, "Shore $D_2$" should read -- Shore D --; in column 8, line 20, "stirred" should read -- stirrer --. In column 9, line 19, "67" should read -- 66 --; in column 9, line 20, "176" should read -- 170 --; in column 9, line 21, "0" should read -- 7 --. In column 10, lines 38-39, "phenylmercuric-oleate" should read -- phenylmercuric oleate --; in column 10, line 68, "p.s.i." should read -- pli. --

Signed and sealed this 22nd day of February 1972.

(SEAL)
Attest:

EDWARD M. FLETCHER, JR.            ROBERT GOTTSCHALK
Attesting Officer                     Commissioner of Patents